INVENTOR
BERNARD MAZELSKY
BY Heizig, Walsh + Blackburn
ATTORNEYS

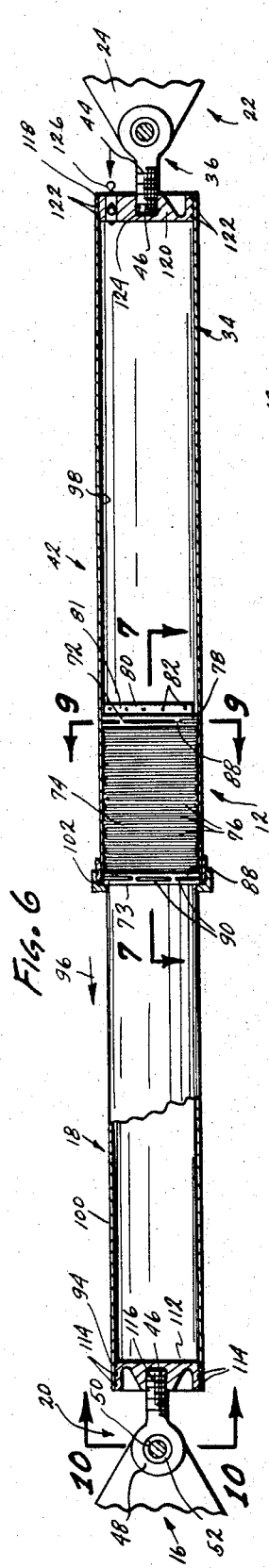

INVENTOR
BERNARD MAZELSKY

Aug. 11, 1970  B. MAZELSKY  3,523,587
ENERGY ABSORBING STEERING MECHANISM FOR VEHICLES
Filed Oct. 2, 1967  6 Sheets-Sheet 4
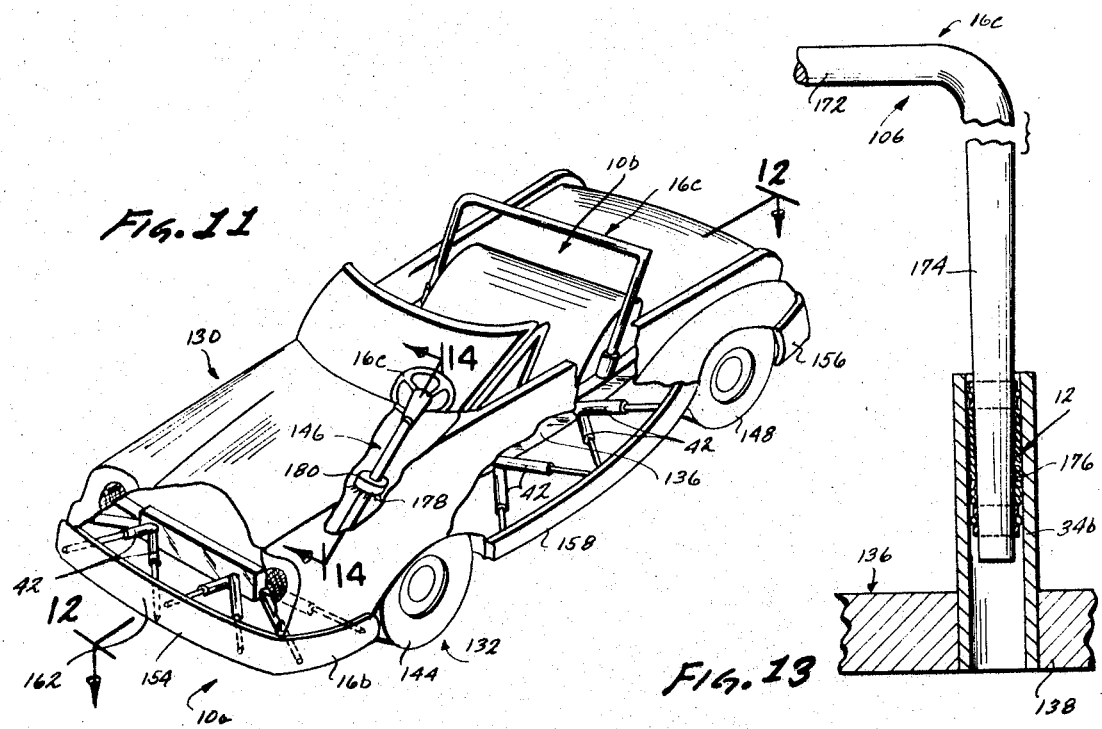
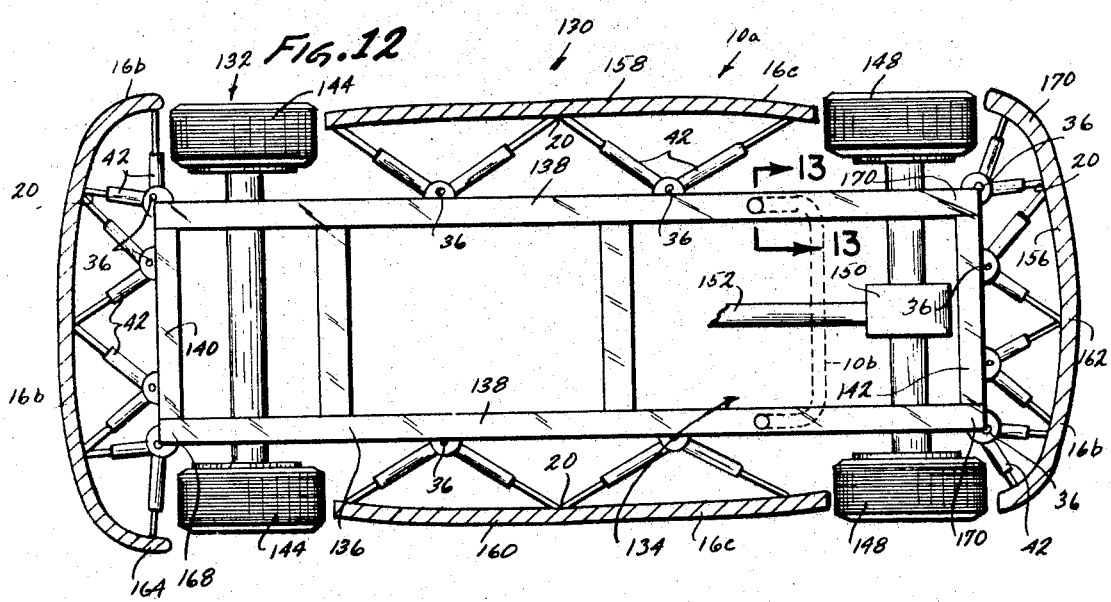
INVENTOR
BERNARD MAZELSKY
BY Herzig, Walsh & Blackham
ATTORNEYS Aug. 11, 1970  B. MAZELSKY  3,523,587
ENERGY ABSORBING STEERING MECHANISM FOR VEHICLES
Filed Oct. 2, 1967  6 Sheets-Sheet 5
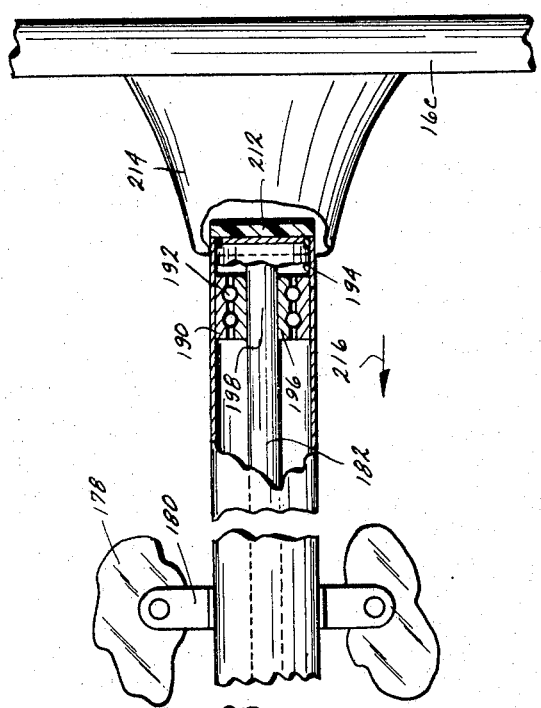
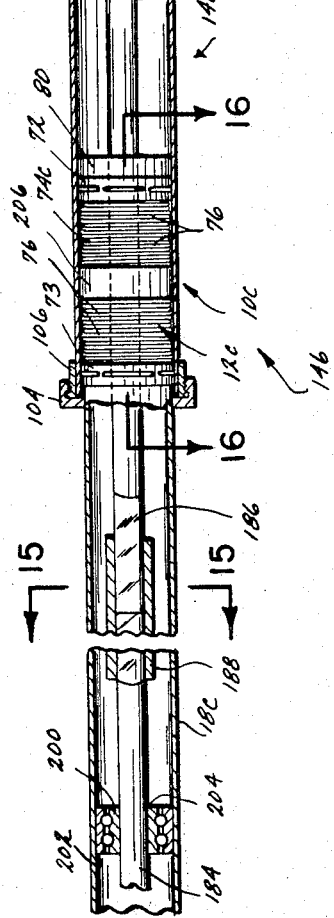
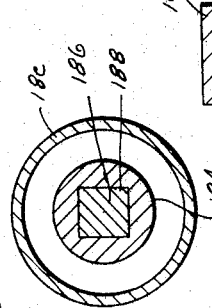
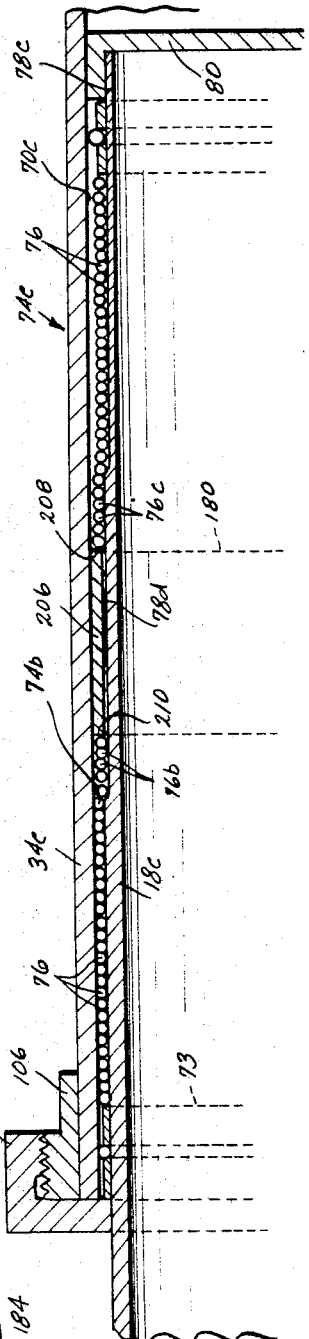
INVENTOR
BERNARD MAZELSKY
BY Herzig, Walsh & Blackham
ATTORNEYS Aug. 11, 1970 — B. MAZELSKY — 3,523,587
ENERGY ABSORBING STEERING MECHANISM FOR VEHICLES
Filed Oct. 2, 1967 — 6 Sheets-Sheet 6
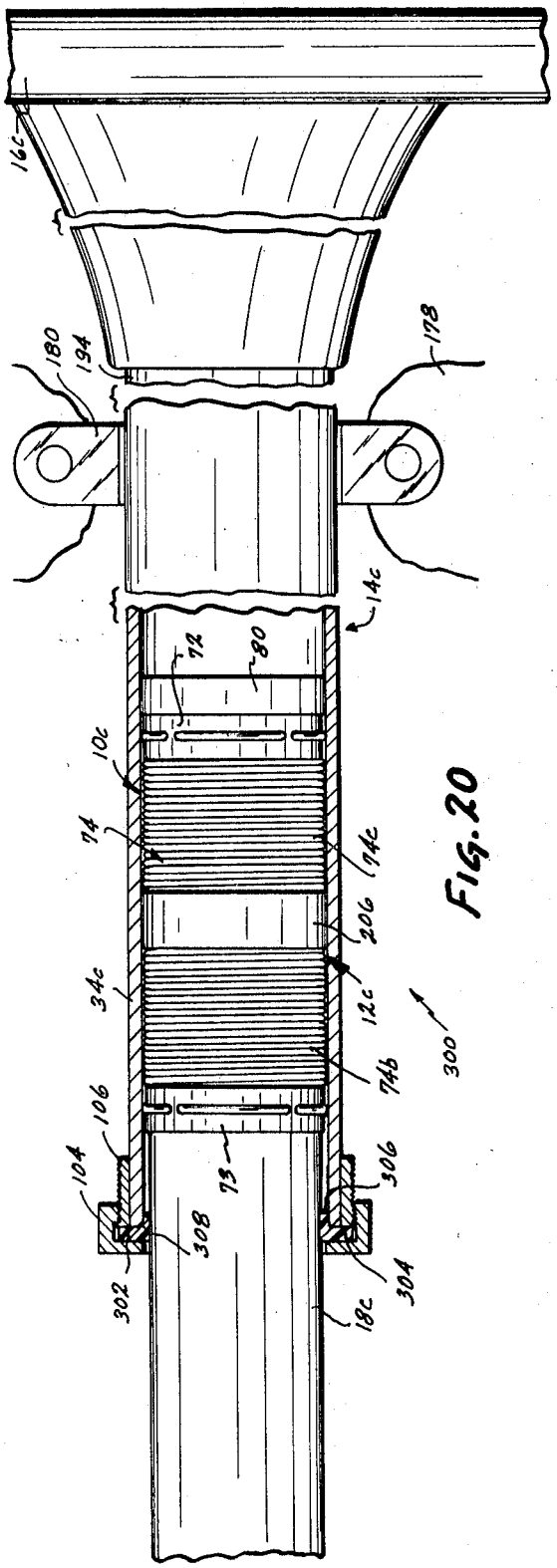
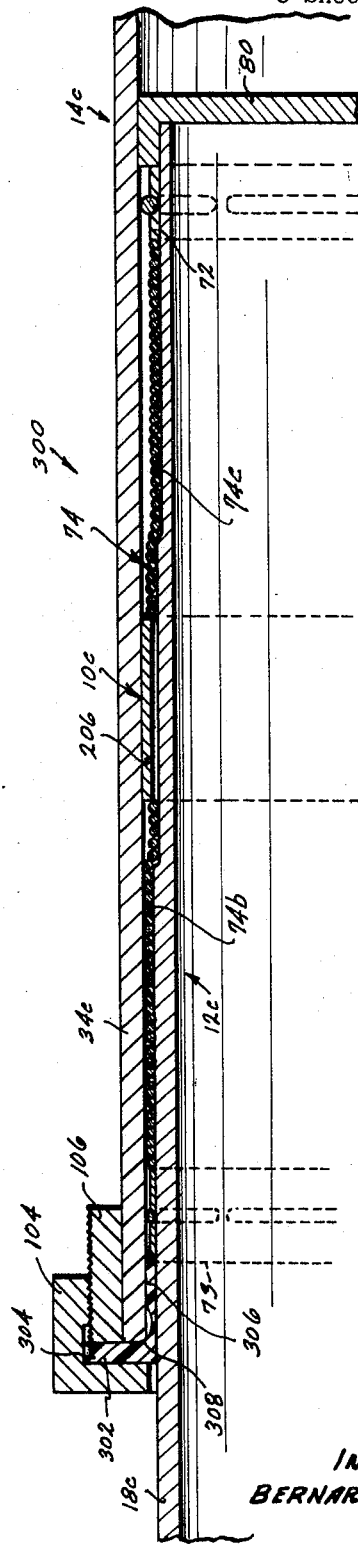
INVENTOR
BERNARD MAZELSKY
ATTORNEYS

United States Patent Office 3,523,587
Patented Aug. 11, 1970

---

3,523,587
ENERGY ABSORBING STEERING MECHANISM
FOR VEHICLES
Bernard Mazelsky, West Covina, Calif., assignor to ARA,
Inc., a corporation of Delaware
Continuation-in-part of application Ser. No. 558,317,
June 17, 1966. This application Oct. 2, 1967, Ser.
No. 672,138
Int. Cl. F16f 7/12
U.S. Cl. 180—82    8 Claims

ABSTRACT OF THE DISCLOSURE

An upper steering column means is telescopically engaged by a lower steering column means having cycling and energy absorbing means operatively associated therewith for absorbing energy by deformation and reverse deformation in response to mechanical energy transmitted thereto by at least one of the steering column means.

CROSS-REFERENCE TO RELATED APPLICATION

This application is a continuation-in-part of a copending application filed June 17, 1966 under Ser. No. 558,-317 for Energy Absorbing Device.

BACKGROUND OF THE INVENTION

The background of the invention is set forth in two parts:

Field of the invention

The present invention pertains generally to the field of non-destructive energy absorbing devices in combination with steering mechanisms for vehicles and more particularly to such a combination which includes an improved device of the type disclosed in Pat. No. 3,231,049 wherein mechanical energy is absorbed by the cyclic plastic deformation of a solid material.

Description of the prior art

While generally satisfactory, energy absorbing devices of the type disclosed in said Pat. No. 3,231,049 have the limitation that rate of change of energy absorption remains substantailly constant during the stroking distance of the absorber; that is, the attenuation force is constant with stroking distance.

SUMMARY OF THE INVENTION

In view of the foregoing, it is a primary object of the present invention to provide a new and useful steering mechanism which includes an energy absorbing device not subject to this limitation and including means for increasing the rate of change of energy absorption of the device by increasing or decreasing the attenuation during the stroking distance of the absorber.

Another object of the present invention is to provide a new and useful steering mechanism including a linear-acting energy absorbing device of the type described which is especially designed for absorbing energy safely and efficiently even when subjected to non-axial impacts.

Yet another object of the present invention is to provide a new and useful steering mechanism including energy absorbing device of the type described which is not destroyed during an energy-absorbing cycle.

Another object of the present invention is to provide a steering mechanism including an energy absorbing device wherein energy is absorbed by causing cyclic plastic tension deformation and compression deformation in an energy absorbing body.

According to the present invention, a steering mechanism for an automobile includes upper and lower steering column means telescopically engaging each other in operative association with a cycling and energy absorbing means in the form of a solid body adapted to absorb energy by cyllic plastic tension deformation and compression deformation in response to mechanical energy transmitted thereto by at least one of said steering column means. Two embodiments are disclosed. In each embodiment, the steering mechanism includes means for increasing the rate of change of energy absorbed by the cycling and energy absorbing means during the stroking distance of the device by having the attenuation force increase or decrease with the stroking distance. One embodiment includes means for absorbing energy from non-axial impacts.

As used herein, the term "mechanical energy" may be defined according to its conventional definition, i.e., a force acting through a distance. Also, as used in the present application, the term "cyclic plastic deformation" refers to the deformation of any solid material around a hysteresis curve, as illustrated in FIG. 21 of said Pat. No. 3,231,049. In addition, the terms "arcuate body," "toroidal body" and "helical body" shall include any body which may be operated upon to cause cyclic plastic tension deformation and compression deformation.

The features of the present invention which are believed to be novel are set forth with particularly in the appended claims. The present invention, both as to its organization and manner of operation, together with further objects and advantages thereof, may best be understood by reference to the following description, taken in connection with the accompanying drawings in which like reference characters refer to like elements in the several views.

BRIEF DESCRIPTION OF THE DRAWINGS

FIG. 6 is a lonigtudinal, cross-sectional view of a portion of an energy absorbing device which may be used in combination with a steering mechanism constituting a first embodiment of the present invention;

FIG. 7 is an enlarged, partial, cross-sectional view taken along line 7—7 of FIG. 6;

FIG. 8 is a view similar to FIG. 7 showing a portion thereof on a greatly enlarged scale to bring out certain details of construction;

FIG. 11 is a perspective view, with parts broken away to show internal construction, of an automobile having a steering mechanism of the present invention employing energy absorbing devices of the present invention which are also shown in combination with automobile bumpers, and a roll-bar;

FIG. 12 is an enlarged, cross-sectional view taken along line 12—12 of FIG. 11;

FIG. 13 is an enlarged, partial cross-sectional view taken along line 13—13 of FIG. 12;

FIG. 14 is an enlarged, partial cross-sectional view taken along line 14—14 of FIG. 11;

FIG. 15 is an enlarged cross-sectional view taken along line 15—15 of FIG. 14;

FIG. 16 is an enlarged, partial cross-sectional view taken along line 16—16 of FIG. 14;

FIG. 20 is a view similar to FIG. 14 showing a second modified steering mechanism; and FIG. 21 is an enlarged, partial cross-sectional view taken along line 21—21 of FIG. 20.

DESCRIPTION OF THE PREFERRED EMBODIMENT

Referring again to the drawings and particularly to FIGS. 1–4, during the impact of an automobile with a stationary object, it is well known that the automobile will provide some measure of attenuation due to its permanent deformation of the bumper, radiator, frame and the like, even though some mechanism of energy absorption is not included in the automobile. If an accelerometer is placed at the steering column-wheel junction, the acceleration measured during the impact will most probably experience a half sine wave type shape similar to that shown in FIG. 1. Although the exact shape of the input acceleration shown is difficult to describe exactly, two parameters appear to be common to this class of input acceleration. These are the peak acceleration, $a_o$, and the duration time of the acceleration, $\Delta t$. From an analysis of numerous water and land impact tests, the half sine wave shape appears to represent the input acceleration curve due to crushing of the test body during impact. Assuming the crushing mechanism is similar for the automobile, a mathematical analysis of the requirements for the energy absorbing device or attenuator may be established when applied to the steering column.

Figure 1:
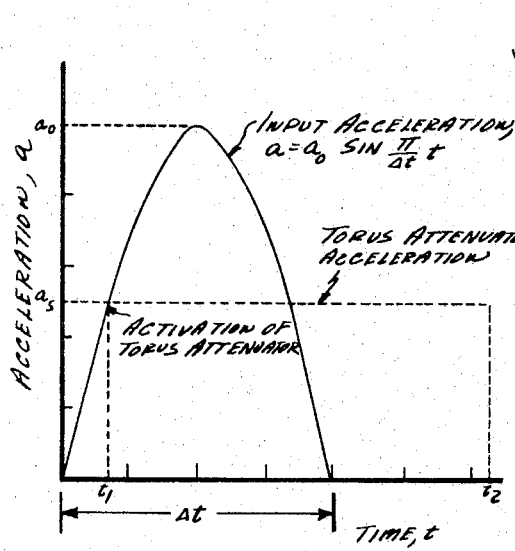
FIG. 1 is a graph showing acceleration plotted against time.

In FIG. 1, an energy absorbing device's acceleration curve is superimposed on the half sine wave for the purpose of illustrating the three additional parameters required to describe its mathematical characteristics. These are given as follows: At $t_1$, the device is activated at an acceleration level corresponding to $a_s$, which is experienced during the input acceleration of the crash, and operates at this level until the velocity of the device is zero, which occurs at time $t_2$.

Figure 2:
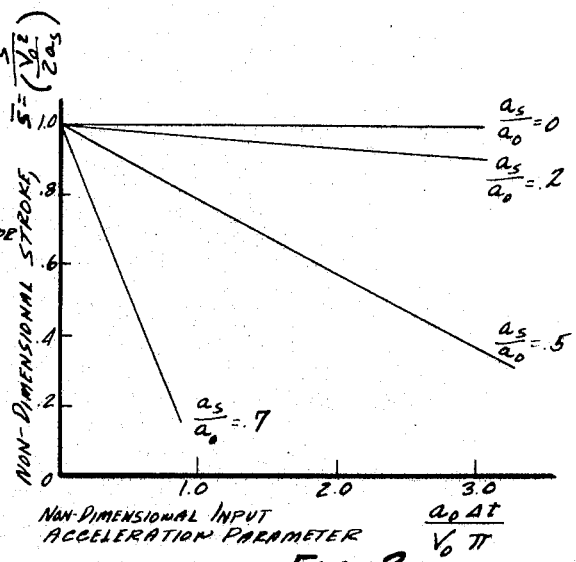
FIG. 2 is a graph showing non-dimensional stroke plotted against a non-dimensional input acceleration parameter.
Figure 3:
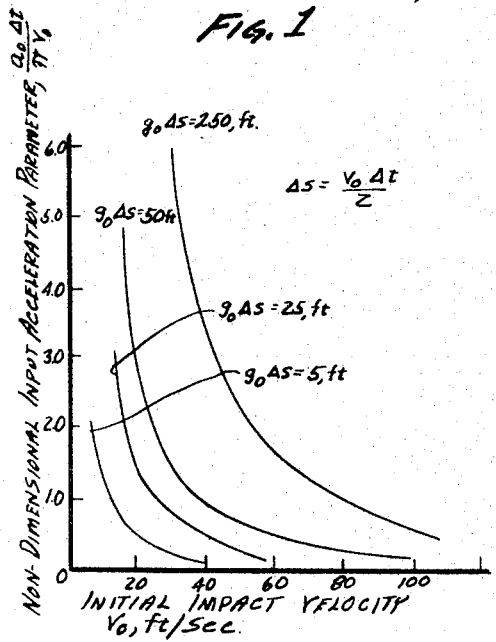
FIG. 3 is a graph showing a non-dimensional input acceleration parameter plotted against initial impact velocity.

Based on the acceleration characteristics shown in FIG. 1, a solution for the stroke requirements for the energy absorbing device may be developed as a function of three variables: the ratio of the device's acceleration to peak input acceleration, $a_s/a_o$; a non-dimensional acceleration ratio $$\frac{a_o \Delta t}{\pi V_o}$$

where $V_o$ corresponds to the initial impact velocity; and a non-dimensional stroke parameter $$\bar{s} = \frac{s}{(V_o^2/2a_s)}$$

where $s$ is the stroke of the energy absorbing device stroke. The non-dimensional stroke requirement, $\bar{s}$, for the device is plotted in FIG. 2 as a function of the other two parameters. Examination of the results of this figure indicate that, if benefits are to be derived from the attenuation caused by the crushing of the automobile, a value of $a_s/a_o$ equal to 0.5 or greater must be realized. In addition, if values of $$\frac{a_o \Delta t}{\pi V_o}$$

are less than unity, the benefits of attenuation due to the crushing of the automobile may be difficult to realize unless the ratio $a_s/a_o$ is close to unity, which is extremely impractical. Since the engineering signficance of the parameter $a_s/a_o$ is self-explanatory, the only two parameters that require some clarification are the input acceleration parameter $$\frac{a_o \Delta t}{\pi V_o}$$

and the stroke parameter $V_o^2/2a_s$. The first parameter, which consists of variables used to define the input acceleration curve shown in FIG. 1, may be evaluated in terms of the intial impact velocity, $V_o$, and the parameter involving the product of the peak "$g$" forces, $g_o$, and the distance $\Delta_s$, which is a measure of the input velocity $V_o$ times $\Delta t$, which describes the duration of the input acceleration. The characteristics of the acceleration parameter $$\frac{a_o \Delta t}{\pi V_o}$$

are plotted in FIG. 3 as a function of the initial impact velocity, $V_o$, and the product parameter $g_o \cdot \Delta_s$. Examination of the results of FIG. 3 indicate that for an impact velocity less than 20 ft. per second and for reasonable values of $g_o \cdot \Delta_s$, values of the impact acceleration parameter $$\frac{a_o \cdot \Delta t}{\pi V_o}$$

will be greater than one; however, for impact velocities from 40 to 100 feet per second, values of $g_s \cdot \Delta_s$ greater than 100 must be attained or else the benefits derived from the reduction of stroke shown in FIG. 2 due to the input acceleration parameter $$\frac{a_o \cdot \Delta t}{\pi V_o}$$

will not be realized. In more physical terms, if an input peak acceleration of 100 $g$'s is experienced during a crash, then the total permanent deformation due to the automobile bumper, radiator, frame, guard rail and the like must exceed at least one foot and possibly five feet at high impact velocities. The results of FIG. 3 clearly indicate that for high velocity impact (in the range of 40 to 100 ft./sec.), then the attenuation of the driver through the steering column may be implemented by additional sources, such as an energy absorbing bumper or guard rail to minimize load levels and stroking distances of the driver.

Figure 4:
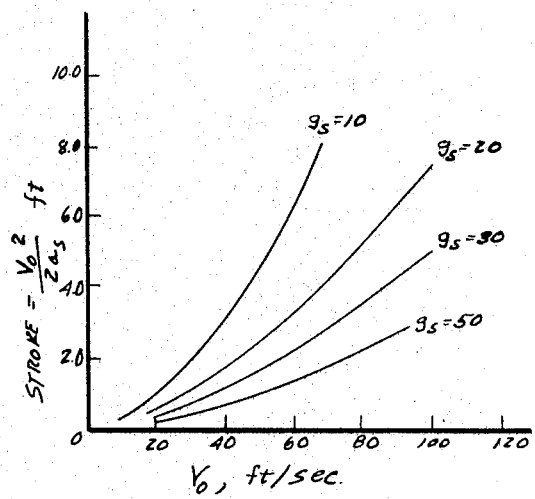
FIG. 4 is a graph showing stroke plotted against velocity.

In order to determine the actual stroke distance required for the steering column from the parameter, $\bar{s}$, shown in FIG. 2, a plot of the stroke parameter $V_o^2/2a_s$ is provided in FIG. 4 as a function of the impact velocity $V_o$ and several prescribed $g$ load levels of the torus attenuator located in the steering column. Once a value of the non-dimensional stroke distance $\bar{s}$ is determined from FIG. 2, the actual stroke distance required for the attenuator is obtained by multiplying $\bar{s}$ times the value of $V_o^2/2a_s$ obtained from FIG. 4, which is a function of the impact velocity $V_o$ and the operating $g$ force of the device, $g_s$.

Through proper automotive design and/or barrier design, let it be assumed that a value of $\bar{s}=0.5$ can be obtained from FIG. 2. For an impact velocity of 80 feet per second, which corresponds to 54.5 miles per hour, and at a $g$ level of the energy absorbing device or attenuator of 30, which according to established human tolerance criteria is acceptable without injury to the driver (in the fore and aft direction), a stroke requirement of $3 \times .5 = 1.5$ feet is required for the steering column attenuator. If the value of $\bar{s}=0.5$ cannot be obtained by proper automotive and/or barrier design, then a value of $\bar{s}=0.9$ would be realized and consequently the steering column attenuator would require almost three feet of stroke for this same impact condition. It is quite clear that where 1.5 feet of stroke in the steering column is practical and values of 3 feet or greater are not practical, then the prevention of injury to a driver at relatively high speed, namely 80 feet per second or 54.5 miles per hour, is not feasible for any steering column attenuator system unless implemented by the attenuation available from other sources.

One such source of attenuation comprises the highway barrier shown at 10 in said copending application Ser. No. 558,317. This barrier included a cycling and energy absorbing means 12 and an energy transmitting means 14, as shown in FIGS. 5-10 herein.

The energy transmitting means 14 includes an impact receiving means 16, an inner tubular member 18, a first connector means 20 and a support means 22. The support means 22 includes a fixed support 24 and an outer tubular member 34, which maintains the cycling and energy absorbing means 12 in operative association with the inner tubular member 18 and maintains the alignment of the member 18 with the cycling and energy absorbing means 12. The support means 22 also includes a second connector means 36 for connecting the outer tubular member 34 to the support 24. The inner tubular member 18, the outer tubular member 34 and the cycling and energy absorbing means 12 form an attenuator assembly 42.

Each attenuator assembly 42 has a stroke of approximately 24 inches from its fully extended position to its fully compressed position where the inner tubular member 18 is substantially completely disposed within the outer tubular member 34. The attenuators 42 absorb energy in a manner to be hereinafter described by being stroked when impact receiving means 16 receives an impact from an automobile or the like. The energy absorbing capability of the attenuators 42 is such that the stroking of a particular attenuator will commence without substantial injury to a driver or passenger in the automobile.

Figure 10:
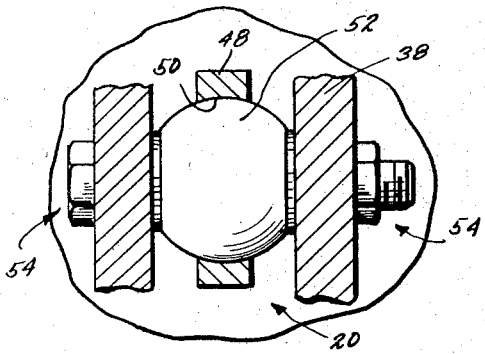
FIG. 10 is an enlarged, partial, cross-sectional view taken along line 10—10 of FIG. 6.
Figure 17:
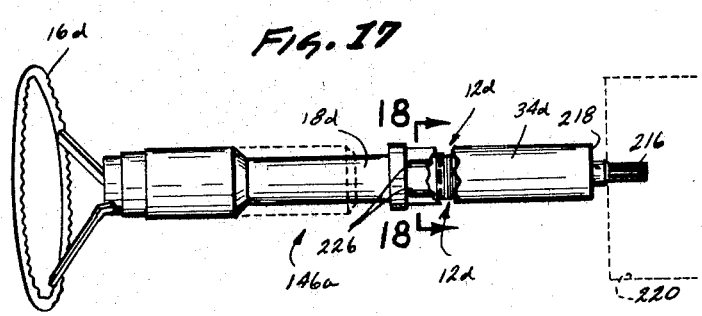
FIG. 17 is a plan view, with parts broken away to show internal construction of a first modified steering mechanism of the type shown in FIG. 14.

Each connector means 36, 20 includes an eye bolt 44 having an externally threaded end 46 and a socket end 48. The socket end 48 includes a socket 50 in which a ball member 52 is articulately mounted for connection to an associated support 24 or an associated impact receiving means 16, respectively, by a bolt and nut assembly 54 (FIG. 10). When the impact receiving means 16 is in its before-impact position, the attenuators 42 form an angle of approximately 45° with the impact receiving means 16. The articulated nature of the connector means 20, 36 and the before-impact position of the impact receiving means 16 assures that the stroke of the impact receiving means 16 will be approximately restricted only by the distance associated with the diameter of the attenuators 42 and not by their compressed length. In addition, this arrangement insures that the attenuators 42 and the connector means 20, 36 will remain intact regardless of the impact angle.

Figure 5:
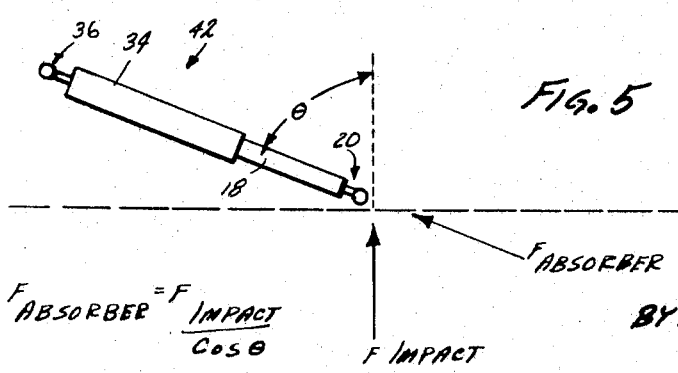
FIG. 5 is a force diagram showing somewhat schematically an energy absorbing device of the present invention when subjected to non-axial impacts.
Figure 9:
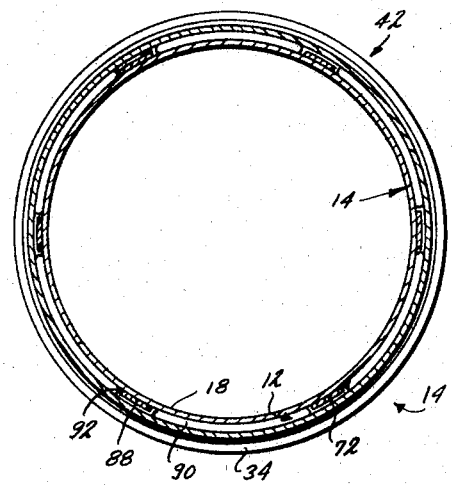
FIG. 9 is an enlarged, cross-sectional view taken along line 9—9 of FIG. 6.
Figure 18:
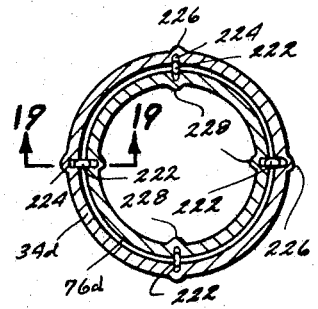
FIG. 18 is an enlarged, cross-sectional view taken along line 18—18 of FIG. 17.

Referring now more in particular to FIG. 5, if optimum energy absorption is to be obtained, F impact should be a constant during the stroking distance of the attenuator 42. For this condition, the force, F attenuator, must necessarily increase with stroke with the variation of $1/\cos\theta$ where $\theta$ would vary possibly from 45° to 75° during the stroke. This increasing force with stroke is manufactured into the attenuators 42 in a manner to be hereinafter described. Since the impact receiving means 16 is designed not to deform permanently during the excursion of the attenuators 42, and since the attenuators work in both the tension and compression strokes, every attenuator will be operative regardless of the angle of the impact force. Thus, the impact force is distributed over a maximum area of the impact receiving means 16 resulting in least likelihood of any one attenuator bottoming out.

The inside diameter of the outer tubular member 34 is sufficiently greater than the outside diameter of the inner tubular member 18 that an annular space or chamber 70 is provided therebetween. The cycling and energy absorbing means 12 is mounted in the chamber 70 in operative association with the outer tubular member 34 and the inner tubular member 18 for absorbing energy by cycling plastic deformation and its reversed deformation in response to mechanical energy transmitted thereto by the energy transmitting means 14. The cycling and energy absorbing means 12 comprises a working cage 72, a stacking cage 73 and a solid, non-elastomeric, radially uncompressed, arcuate body in the form of a helical coil 74 having a plurality of turns 76. Each turn 76 constitutes an arcuate body adapted to be subjected to cyclic plastic tension deformation and compression deformation by the rotation of each turn 76 about its internal axis. The cycling and energy absorbing means 12 is prevented from moving past the end 78 of the tubular member 18 by a retainer cap 80 which includes a sidewall 81 encompassing the end 78, and secured thereto by suitable weldments 82, and a bottom wall 84 having a function to be hereinafter described. The sidewall 81 has an upper edge 86 engageable by the working cage 72 for preventing it from moving past the end 78.

The working cage 72 and the stacking cage 73 each includes a band 88 encompassing the inner tubular member 18 and a plurality of arcuate bodies 90 which are mounted in elongated openings 92 provided in an associated band 88.

The amount of energy absorbed by each attenuator 42 will depend, in part, upon the number of turns 76 which are rotated about their internal axes during a particular stroke. The number of turns 76 which are rotated depend upon whether or not they are brought into working engagement with the inner tubular member 18 and the outer tubular member 34 during a particular stroke. The turns 76 are programmed into working engagement with the inner tubular member 18 and the outer tubular member 34 during a particular stroke to produce the increasing force with stroke which is manufactured into each attenuator 42. This is accomplished by tapering the inner tubular member 18 a predetermined amount from its end 78 to its other end 94. Such a taper provides a varying chamber 70 resulting in the increasing force with stroke. The amount of taper depends on the length of the inner tubular member 18, its diameter and the diameter of the turns 76, as will be more fully explained hereinafter.

During a particular stroke, the working cage 72, because of the rotation of the arcuate bodies 90 about their internal axes, not only absorbs energy, but also moves the turns 76 on the helical body 74 into working engagement with the outer tubular member 34 by sliding the turns 76 along the inner tubular member 18 in the direction of arrow 96. A predetermined number of turns 76 are initially in working engagement with the inner tubular member 18 and the outer tubular member 34 so that the cycling and energy absorbing means 12 will absorb a predetermined amount of energy upon initial impact. In order to be placed in working engagement with the inner tubular member 18 and the outer tubular member 34, the inner wall 98 of the outer tubular member 34 and the outer wall 100 of the inner tubular member 18 must exert sufficient frictional force on the turns 76 to rotate them about their internal axes. At the end of the stroke, the cycling and energy absorbing means 12 may be returned to the end 78 of the inner tubular member 18 by extending an associated attenuator 42. During this extension, the stacking cage 73 assures that the turns 76 will remain neatly stacked.

When a particular attenuator 42 is fully extended, the cycling and energy absorbing means 12 is prevented from leaving the open end 102 by a nut 104 which engages an externally threaded collar 106 secured to the end 102 of the tubular member 34 by suitable weldments 108.

Although a number of different parameters will manifest themselves for the various components of each attenuator 42, an illustrative set of values is as follows:

The inner tubular member 18 may comprise a 17-7PH, heat treated, stainless steel, hollow, cylindrical body having a 0.025 inch wall thickness, as indicated by arrows 110 in FIG. 8, an effective length of 12 inches and a 2.718 inch outside diameter at the end 94 tapering to a smaller diameter at the rate of 0.006 inch per foot in the direction of end 78.

The outer tubular member 34 may comprise a 17–7PH heat treated stainless steel, hollow cylindrical body having a 0.025 inch wall thickness and a 2.843 inch outside diameter.

The annular chamber 70 has a thickness of approximately 0.037 inch between the outer tubular member 34 and the inner tubular member 18 at the end 94 of the inner tubular member 18 with a corresponding increase in thickness at the rate of 0.006 inch per foot moving toward the end 78 to a maximum increase of 0.0015 inch.

The arcuate bodies 90 in the cages 72 and 73 are each made from a 302 stainless steel wire and are each approximately 0.0465 inch in diameter and 0.87 inch long. Six such bodies are provided in each of the cages 72, 73 and approximately 180 pounds of force are required to move each cage.

The helical coil 74 is made from a 302 stainless steel wire having approximately 0.045 inch diameter and includes approximately 80 turns, designated 76. It requires approximately 200 pounds of force to rotate each turn about its internal axis. Since the chamber 70 has a maximum change in thickness of 0.0015 inch and the arcuate bodies 90 have a 0.0015 inch greater diameter than the turns 76, the cages 72, 73 will always be in working engagement with the members 18 and 34. This assures that the cages 72, 73 will always push the turns 76 during stroking of the attenuators 42.

The connector means 20 is secured to the end 94 of an associated attenuator 42 by a plug 112 which is secured in the open end 94 of the inner tubular member 18 by suitable weldments 114 and which includes an internally threaded counterbore 116 threadedly receiving the threaded end 46 of eye bolt 44.

The connector means 36 is secured to the end 118 of the outer tubular member 34 by an end cap 120 which is secured in the open end 118 by suitable weldments 122 and which includes an internally threaded counterbore 124 threadedly receiving the externally threaded end 46 of eye bolt 44. An air inlet valve 126 is mounted in the end cap 120 for introducing compressed air into the interior of the outer tubular member 34 for exerting a force against the closed bottom wall 84 of the end cap 80 for the purpose of extending the attenuator 42 after it has been compressed.

A steering mechanism constituting a first embodiment of the present invention will now be described in connection with FIGS. 11–16 wherein an automobile 130 includes a chassis 132 and a body 134. The chassis 132 includes a frame 136 having parallel side members 138, a front end piece 140 and a rear end piece 142. The chassis also includes a pair of front wheels 144, a steering mechanism 146, a pair of rear wheels 148, a differential 150 and a drive shaft 152.

The automobile 130 is provided with an energy absorbing device 10a including a front bumper 154, a rear bumper 156, a left hand bumper 158 and a right hand bumper 160. The several bumpers are each connected to the frame 136 by attenuators 42, which may be identical to those previously described. The front bumper 154 includes an impact receiving means in the form of a bumper bar 16b of the wrap-around type having a front portion 162 connected to the front end piece 140 by four attenuators 42 and associated connector means 20 and 36, a right hand section 164 extending around the front of the automobile 130 to a point adjacent the right hand wheel 144, and a left hand section 166 extending around the left hand side of the automobile 130 to a point adjacent the left front wheel 144. The sections 164 and 166 are connected to the front ends 168 of their associated pair of attenuators 42 and connecting means 20 and 36. The bumpers 158 and 160 each include an impact receiving means in the form of a bumper bar 16c connected to an associated side member 138 by four attenuators 42 and associated connector means 20 and 36. The connector means 20, 36, which are identical to those described in connection with FIGS. 11–18, are connected to their associated bumper bars and the frame 136 at the same relative locations as those employed for the energy absorbing device 10. The attenuation of the driver of the automobile 130 through the energy absorbing device 10a will be apparent to those skilled in the art.

The automobile 130 also includes an energy absorbing device 10b including a U-shaped roll-bar comprising an impact receiving means 16c. The impact receiving means 16c includes a bight portion 172 and parallel arms 174. Each arm 174 may be provided with a tapered end 176 having a taper similar to that previously described in connection with the attenuator 42. A cycling and energy absorbing device 12 of the type previously described is provided in operative association with the end 176 of arm 174 and an outer tubular member 34b, which may be rigidly affixed to an associated side member 138. Should the vehicle 130 roll over, the driver will be attenuated through the energy absorbing device 10b by compressing the arms 174 into the outer tubular member 34b causing the cycling and energy absorbing device 12 to absorb the energy of the impact.

The body 134 also includes a dashboard 178 to which the steering mechanism 146 is attached by a clamp 180. The steering mechanism 146 includes an energy absorbing device 10c comprising a cycling and energy absorbing means 12c and an energy transmitting means 14c. The energy transmitting means 14c includes an impact receiving means 16c, constituting a steering wheel for the automobile 130, an outer tubular member 34c and an inner tubular member 18c, constituting a steering column housing. The steering mechanism 146 also includes an upper steering shaft 182 operatively connected to the impact receiving means 16c and a lower steering shaft 184 operatively connected to the front wheels 144 for steering the automobile 130. The steering shafts 182 and 184 are telescopically connected together by a square end 186 on the upper shaft 182 which is reciprocably mounted in a mating square sleeve 188 on the lower shaft 184. The upper shaft 182 is rotatably mounted in a bearing 190 having an outer race 192 fitted in the open end 194 of the outer tubular member 34c and an inner race 196 encompassing the upper end 198 of the shaft 182. The lower shaft 184 is rotatably mounted in a bearing 200 having an outer race 202 frictionally fitted within the inner tubuar member 18c and an inner race 204 frictionally fitting the lower steering shaft 184.

The cycling and energy absorbing means 12c may include a working cage 72 and a stacking cage 73 which are maintained in operative association with the inner tubular member 18c by the end cap 80 and the nut 104 and collar 106, respectively, all of which may be identical to the elements previously described in connection with FIG. 6. The outer tubular member 34c and the inner tubular member 18c may be made of the same material and have substantially the same parameters as those previously described in connection with FIG. 6. However, the increasing force with stroke is dispensed with. As herein shown and described, a controlled onset rate is incorporated into the energy absorbing device 10c by chemically-milling approximately 0.003 inch of material away from a 1½ inch-long section at the end 78c and approximately 0.002 inch away from a 1½ inch-long section 78d adjacent the end 78c. A first helical body 74c may then be mounted on the end 78c. A spacer member 206 may then be placed against the end 208 of the helical body 74c with a second helical body 74b placed against the end 210 of the spacer 206. The bodies 74c and 74b each have a plurality of turns 76 identical to those previously described. The onset rate of the energy absorbing device 10c may then be controlled by selecting a spacer 206 of a suitable width. For example, as herein shown, the spacer 206 maintains a predetermined number of turns 76c in the wider annular space 70c, where the most material was milled away from the end 78c and a second predetermined number of turns 76c in the portion of the annular chamber 70c formed by the milling of the 0.002 inch of material from the inner tubular member 18c. Also, a predetermined number of turns 76b will also be maintained in full working engagement with the inner tubular member 18c and the outer tubular member 34c. The spacer 206 controls the character of the onset force by programming the arrival of the individual turns 76 into working engagement with the inner tubular member 18c and the outer tubular member 34c wherein sufficient frictional force is involved to cause the individual turns 76 to rotate about their internal axes. It is apparent that the onset rate may be changed by choosing a differen width for the spacer 206. Although this varying onset rate subjects a driver of the automobile 130 to less initial shock, it requires an increased stroking distance for the energy absorbing device 10c. This stroking distance may be minimized by eliminating the chemical milling process and the spacer 206 so that all turns 76 will always be in working engagement. In this case, it may be desirable to lessen the shock of the initial impact on the driver of the vehicle 130 by providing an elastomeric attenuator 212 in the hub portion 204 of the impact receiving means 16c to absorb some of the initial shock as the driver strikes the impact receiving means 16c driving it against the end 194 of the outer tubular member 34c causing it to move in the direction of arrow 216 for cycling the cycling and energy absorbing means 12c. The driver may be additionally attenuated through the clamp 180 by having it frictionally engage the outer tubular member 34c in such a manner that it requires a predetermined force to move the outer tubular member 34c in the direction of arrow 216.

Figure 19:
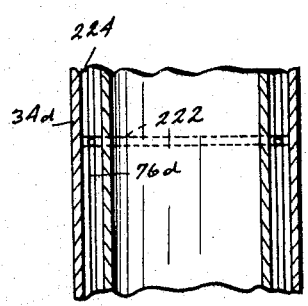
FIG. 19 is an enlarged, partial cross-sectional view taken along line 19—19 of FIG. 18.

The steering mechanism 146 is designed for use in those steering systems wherein an outer, non-rotatable steering column houses the rotating portion of the steering system. In those steering systems where it is permissible to have the rotating portion of the system exposed, a modified steering mechanism 146a (FIGS. 17-19) may be used. The steering mechanism 146a includes an impact receiving means 16d in the form of a steering wheel which may be non-rotatably connected to an internal tubular member 18d which is telescopically received in an outer tubular member 34d having a splined shaft 216 affixed to the end 218 thereof. The splined shaft 216 is operatively associated with the customary steering gears which may be housed in a housing represented by the broken lines 220.

The steering mechanism 146a also includes a cycling and energy absorbing means 12d which may be identical to the cycling and energy absorbing means 12c previously described except that a predetermined number of turns 76d may be provided with spherical elements 222 disposed within fluted chambers 224 for non-rotatably connecting the inner tubular member 18d to the outer tubular member 34d while permitting relative reciprocation between the two members. The fluted chambers 224 may be formed by axially extending, arcuate channels 226 formed in the outer tubular member 34d, and matching channels 228 formed in the internal tubular member 18d.

The steering mechanism 146 and the steering mechanism 146a are, for the most part, designed to absorb energy in an axial direction. Since the steering column in a typical automobile is subjected to a turning moment when impacted by the automobile driver or passengers, there is a requirement for the linear type of attenuators used in steering mechanisms 146, 146a to not only absorb energy in the axial direction, but, in addition, to absorb a certain amount of energy in the non-axial direction of the attenuator. The mechanisms 146, 146a may be modified so that they will absorb energy in a non-axial direction, as shown in FIGS. 20 and 21 wherein a steering mechanism 300 is shown for purposes of illustration, but not of limitation, as comprising a steering mechanism identical to the mechanism 146, except that a bushing 302 is installed in the open end of tubular member 34c which is remote from the end 194. The steering mechanism 300 may be connected to the dashboard 178 by the clamp 180 in place of the steering mechanism 146 previously described.

The steering mechanism 300 includes the energy absorbing device 10c previously described as comprising a cycling and energy absorbing means 12c and an energy transmitting means 14c. The energy transmitting means 14c includes the impact receiving means 16c, the outer tubular member 34c and the inner tubular member 18c. The cycling and energy absorbing means 12c may include the working cage 72 and the stacking cage 73 which are maintained in operative association with the inner tubular member 18c by the end cap 80 and the nut 104 and collar 106, respectively. The nut 104 and collar 106 also maintain the bushing 302 in operative association with inner and outer tubular members 18c and 34c.

Economy in the automobile industry dictates that the tubes 18c and 34c be relatively inexpensive. This results in use of a low-strength steel tube such as a 1010 steel tube. Since either the modulus of elasticity and/or yield strength of the helical bodies 74b and 74c should be below that of the tubular members 18c and 34c, the stainless steel wire used for helical coil 74 (FIGS. 6-8) will not suffice. Two materials which have been found to be suitable for the helical bodies 74b and 74c are beryllium copper wire and aluminum wire.

The bushing 302 includes an annular flange 304 and an annular skirt 306 which may be made from a material having a low coefficient of friction. Examples of two such materials are polytetrafluoroethylene and polychlorotrifluoroethylene. The skirt 306 acts as a centering device between tubular members 18c and 34c for the non-axial component of the impact force allowing the inner tubular member 18c to slide with respect to outer tubular member 34c with a minimum of interference between the two members 18c, 34c. Skirt 306 also absorbs a good part of the energy due to the non-axial component by allowing inner tubular member 18c to move laterally by necking-down skirt 306 from its FIG. 20 shape to its FIG. 21 shape. The exact dimensions of bushing 302 are not critical; however, an adequate bearing area should exist between members 18c and 34c and the skirt 306 should have enough material thickness to prevent skirt 306 from shearing from flange 304. Additionally, skirt 306 is provided with a small radius of curvature at 308.

Tests have indicated that, for a steering mechanism having an eight inch stroke when subjected to an axial impact a stroking distance of 5½ inches may be obtained where the steering mechanism 300 departs from the vertical approximately 28 degrees.

Suggested design parameters for the steering mechanism 300 are as follows:

Inner tubular member 18c __ 2.185" O.D. x 0.0635" wall thickness 1010 carbon steel.
Outer tubular member 34c _ 2.375" O.D. x 0.064" wall thickness 1010 carbon steel.
Helical bodies 74b, 74c ____ 0.032" dia. beryllium copper wire.
Bushing 302 _____ 2½" O.D. x ⅛" deep flange and 2¼" O.D. x 9/16" deep skirt having a 0.031" thickness at the bottom and a ⅛" radius from top to bottom.

While the particular energy absorbing steering devices herein shown are described in detail are fully capable of attaining the objects and providing the advantages hereinbefore stated, it is to be understood that they are merely illustrative of the presently preferred embodiments of the invention and that no limitations are intended to the details of construction or design herein shown other than as defined in the appended claims.

What is claimed is:

1. An energy absorbing steering mechanism for a vehicle having steerable wheels, comprising:
    upper steering column means;
    lower steering column means, one of said column means having an open end telescopically engaging the other of said column means;
    means connecting said steering column means to said steerable column means to said steerable wheels; and
    cycling and energy absorbing means operatively associated with said upper and lower steering column means for absorbing energy by deformation and reverse deformation in response to mechanical energy transmitted thereto by at least one of said column means.

2. A steering mechanism as stated in claim 1 including a steering wheel connected to said upper steering column means and an elastomeric attenuator means operatively associating said steering wheel with said upper steering column means.

3. A steering mechanism as stated in claim 1 including bushing means positioned in said open end in operative association with said other column means for reducing sliding friction between said column means.

4. A steering mechanism as stated in claim 3 wherein said bushing is made from a polytetrafluoroethylene material.

5. A steering mechanism as stated in claim 1 wherein said cycling and energy absorbing means comprises a solid, non-elastomeric, radially uncompressed, arcuate body capable of being rotated about its internal axis for absorbing energy by tension deformation and compression deformation during each cycle transmitted thereto by said one column means.

6. A steering mechanism as stated in claim 1 wherein said cycling and energy absorbing means includes a working cage, a helical body and a stacking cage.

7. A steering mechanism as stated in claim 1 including means for controlling the onset rate of said cycling and energy absorbing means for controlling the rate of change of energy absorbed thereby.

8. A steering mechanism as stated in claim 7 wherein said column means comprises:
    an inner tubular member having a tapered end with which said cycling and energy absorbing means is operatively associated; and
    an outer tubular member encompassing said tapered end in operative association with said cycling and energy absorbing means, said onset-rate control means comprising a varying annular chamber formed by said tapered end and said outer tubular member.

References Cited
UNITED STATES PATENTS 3,262,332  7/1966  Wight _____ 74—493

DUANE A. REGER, Primary Examiner

U.S. Cl. X.R.

74—492; 188—1

UNITED STATES PATENT OFFICE
CERTIFICATE OF CORRECTION

Patent No. 3,523,587            Dated August 11, 1970

BERNARD MAZELSKY

It is certified that error appears in the above-identified patent and that said Letters Patent are hereby corrected as shown below:

Column 11, lines 16 and 17 "to said steerable column means" should be deleted.

SIGNED AND SEALED
NOV 24 1970

(SEAL)
Attest:

Edward M. Fletcher, Jr.
Attesting Officer

WILLIAM E. SCHUYLER, JR.
Commissioner of Patents